US012565174B2

(12) United States Patent
Choi et al.

(10) Patent No.: US 12,565,174 B2
(45) Date of Patent: Mar. 3, 2026

(54) AUTHENTICATION SYSTEM AND AUTHENTICATION METHOD

(71) Applicants: HYUNDAI MOTOR COMPANY, Seoul (KR); KIA CORPORATION, Seoul (KR)

(72) Inventors: Seong Woo Choi, Seoul (KR); Seong Min Shin, Uijeongbu-si (KR); Tae Gyu Lee, Seongnam-si (KR); Jae Kyun Park, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 186 days.

(21) Appl. No.: 18/652,330

(22) Filed: May 1, 2024

(65) Prior Publication Data

US 2026/0008432 A1      Jan. 8, 2026

(30) Foreign Application Priority Data

Nov. 6, 2023      (KR) ........................ 10-2023-0151988

(51) Int. Cl.
*B60R 25/24* (2013.01)
*G07C 9/00* (2020.01)
(Continued)

(52) U.S. Cl.
CPC .......... *B60R 25/24* (2013.01); *G07C 9/00571* (2013.01); *G07C 9/22* (2020.01); *G07C 9/27* (2020.01); *H04W 4/14* (2013.01); *H04W 4/40* (2018.02); *H04W 12/06* (2013.01); *B60R 2325/10* (2013.01); *B60R 2325/205* (2013.01)

(58) Field of Classification Search
None
See application file for complete search history.

(56) References Cited

U.S. PATENT DOCUMENTS

| | | | |
|---|---|---|---|
| 9,432,197 | B2 | 8/2016 | Naganuma et al. |
| 2012/0311340 | A1 | 12/2012 | Naganuma et al. |

(Continued)

FOREIGN PATENT DOCUMENTS

| | | |
|---|---|---|
| JP | 2014-082790 A | 5/2014 |
| KR | 2021-0037201 A | 4/2021 |

*Primary Examiner* — Thomas S McCormack
(74) *Attorney, Agent, or Firm* — MCDONNELL BOEHNEN HULBERT & BERGHOFF LLP

(57) ABSTRACT

An authentication system includes a vehicle control device and a server, a first processor and a second processor. The first processor included in the vehicle control device may transmit a signal for requesting authentication information to the server, receive a signal containing first unique information from the server, receive a short message service (SMS) message containing second unique information, transmit a signal containing third unique information to the server based on identifying the second unique information corresponding to the first unique information, receive the authentication information from the server based on the transmitted signal containing the third unique information, and perform a service based on the authentication information. The second processor included in the server may transmit the authentication information to the vehicle control device.

20 Claims, 8 Drawing Sheets

(51) Int. Cl.

| | |
|---|---|
| *G07C 9/22* | (2020.01) |
| *G07C 9/27* | (2020.01) |
| *H04W 4/14* | (2009.01) |
| *H04W 4/40* | (2018.01) |
| *H04W 12/06* | (2021.01) |

(56) References Cited

U.S. PATENT DOCUMENTS

| | | | | |
|---|---|---|---|---|
| 2013/0149998 | A1* | 6/2013 | Yi ......................... | H04W 12/06 455/411 |
| 2015/0163306 | A1* | 6/2015 | Nakagawa .............. | B60R 25/24 709/225 |
| 2015/0172919 | A1* | 6/2015 | Basnayake .............. | H04L 63/12 455/411 |
| 2017/0230797 | A1 | 8/2017 | Lauterbach et al. | |
| 2022/0109561 | A1* | 4/2022 | Yang ....................... | B60R 25/24 |

* cited by examiner

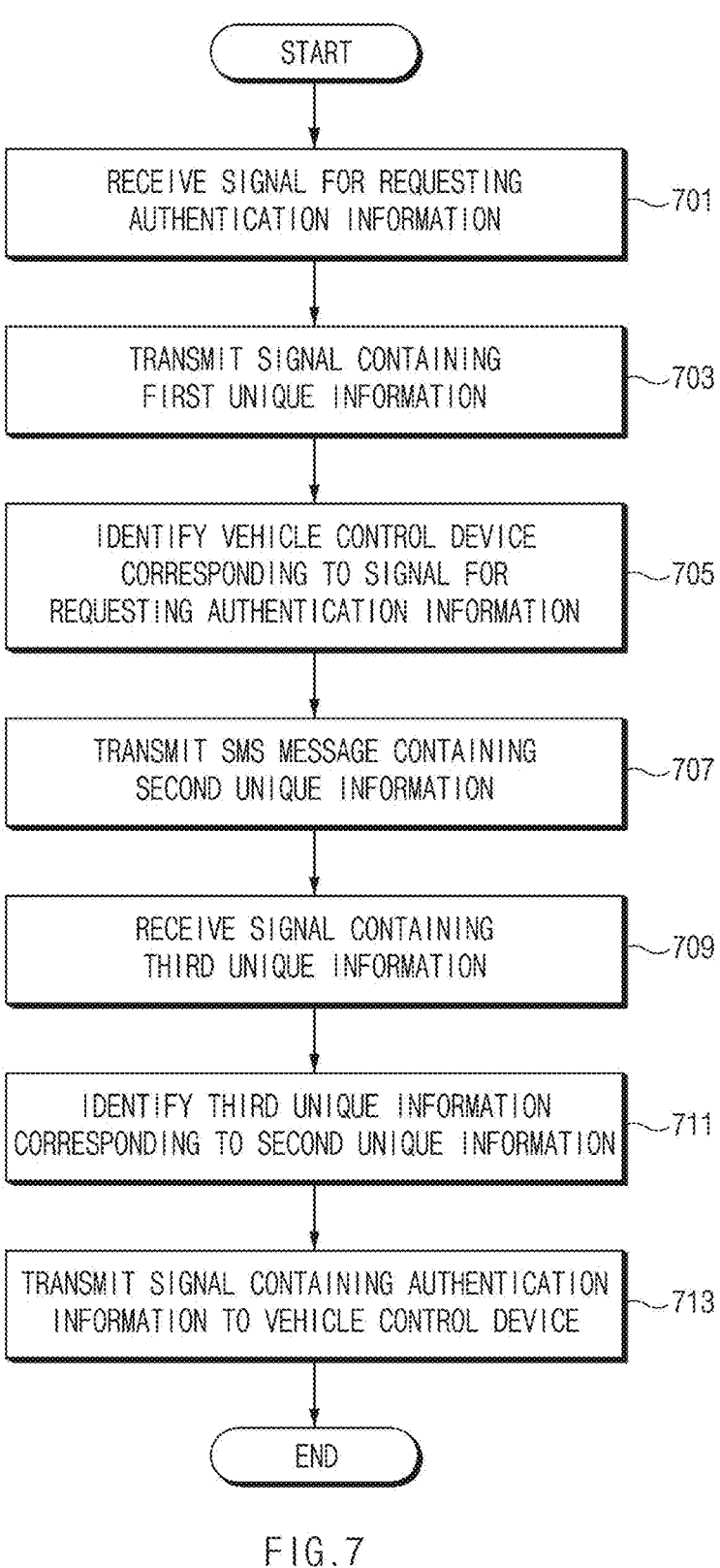

START

RECEIVE SIGNAL FOR REQUESTING
AUTHENTICATION INFORMATION —701

TRANSMIT SIGNAL CONTAINING
FIRST UNIQUE INFORMATION —703

IDENTIFY VEHICLE CONTROL DEVICE
CORRESPONDING TO SIGNAL FOR
REQUESTING AUTHENTICATION INFORMATION —705

TRANSMIT SMS MESSAGE CONTAINING
SECOND UNIQUE INFORMATION —707

RECEIVE SIGNAL CONTAINING
THIRD UNIQUE INFORMATION —709

IDENTIFY THIRD UNIQUE INFORMATION
CORRESPONDING TO SECOND UNIQUE INFORMATION —711

TRANSMIT SIGNAL CONTAINING AUTHENTICATION
INFORMATION TO VEHICLE CONTROL DEVICE —713

END

FIG.7

AUTHENTICATION SYSTEM AND AUTHENTICATION METHOD

CROSS REFERENCE TO RELATED APPLICATIONS

This application claims the benefit of priority to Korean Patent Application No. 10-2023-0151988, filed in the Korean Intellectual Property Office on Nov. 6, 2023, the entire contents of which are incorporated herein by reference.

TECHNICAL FIELD

The present disclosure relates to an authentication system and an authentication method, and more specifically, to a technology for improving the security of authentication services for vehicles by performing authentication through a plurality of channels.

BACKGROUND

Recently, with the development of information and communication technology, two-way communication between vehicles and networks has become possible, leading to the development of technology for transmitting user information to networks or downloading user information from the networks to control vehicles.

To improve user experience, the number of smart devices such as smartphones and smart watches that are linked to vehicles has increased. Additionally, to provide personalized services, user information such as user health information and profile information transmitted over networks has been segmented and expanded. Accordingly, concerns about personal information leakage due to hacking are increasing.

In addition, as technology for controlling vehicles through networks has developed, the risk of malicious vehicle use, such as vehicle theft due to hacking, is also increasing. Accordingly, research is being conducted to improve information security in vehicles.

The technical problems of the present disclosure are not limited to the aforementioned problems, and any other technical problems not mentioned herein will be clearly understood from the following description by those skilled in the art.

SUMMARY

The present disclosure has been made to solve the above-mentioned problems occurring in the prior art while advantages achieved by the prior art are maintained intact.

An aspect of the present disclosure provides an authentication system including a vehicle control device and/or server capable of improving vehicle security by examining the validity of a signal requesting authentication information through a plurality of channels and an authentication method therefor.

An aspect of the present disclosure provides an authentication system including a vehicle control device and/or a server capable of improving vehicle security by examining the validity of a signal requesting authentication information through an SMS message and an authentication method therefor.

An aspect of the present disclosure provides an authentication system including a vehicle control device and/or a server capable of improving vehicle security by specifying a vehicle control device through terminal information assigned by a communication service provider and an authentication method therefor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an authentication system includes a vehicle control device, a server, first processor, and a second processor.

According to an embodiment, the first processor included in the vehicle control device may transmit a signal for requesting authentication information to the server, receive a signal containing first unique information transmitted in response to the signal for requesting the authentication information, from the server, receive a short message service (SMS) message containing second unique information transmitted in response to the signal for requesting the authentication information, transmit a signal containing third unique information corresponding to the second unique information to the server based on identifying the second unique information corresponding to the first unique information, receive the authentication information from the server based on the transmitted signal containing the third unique information, and perform a service based on the authentication information.

According to an embodiment, the second processor included in the server may receive the signal for requesting the authentication information, transmit the signal containing the first unique information in response to the signal for requesting the authentication information, identify the vehicle control device corresponding to the signal for requesting the authentication information, and transmit the SMS message containing the second unique information corresponding to the first unique information to the vehicle control device, and transmit the authentication information to the vehicle control device based on receiving the signal containing the third unique information sent in response to the transmitted SMS message.

According to an embodiment, the first processor included in the vehicle control device may receive the SMS message containing the second unique information through legacy cellular wireless communication. According to an embodiment, the second processor included in the server may transmit the SMS message containing the second unique information through the legacy cellular wireless communication.

According to an embodiment, the first processor included in the vehicle control device may transmit a signal for notifying acquisition of the authentication information to the server based on receiving the authentication information.

According to an embodiment, the authentication information may contain at least one of a vehicle identifier, validity time information for authentication, or issuance information, or any combination thereof.

According to an embodiment, the second processor included in the server may receive a signal containing the third unique information from the vehicle control device, and transmit the authentication information to the vehicle control device based on identifying the third unique information corresponding to the second unique information.

According to an embodiment, the second processor included in the server may store the authentication information and the second unique information based on receiving the signal for requesting the authentication information, and identify the third unique information corresponding to the stored second unique information.

According to an embodiment, the second processor included in the server may generate the first unique information in response to the signal for requesting the authentication information.

According to an embodiment, the server may include a first server including the second processor and a second server including a third processor. The second processor included in the first server may transmit the signal for requesting the authentication information to the second server based on receiving the signal for requesting the authentication information, and to receive the authentication information from the second server.

According to an embodiment, the second processor included in the server may identify the vehicle control device based on pre-registered terminal information of the vehicle control device corresponding to the signal containing the first unique information.

According to an embodiment, the second processor included in the server may request a communication service provider to transmit the SMS message containing the second unique information associated with the vehicle control device based on terminal information assigned to the vehicle control device by the communication service provider, and the first processor included in the vehicle control device may receive the SMS message containing the second unique information from the communication service provider based on the terminal information.

According to an aspect of the present disclosure, an authentication method includes transmitting, by a vehicle control device, a signal for requesting authentication information to a server, receiving, by the server, the signal for requesting the authentication information, transmitting, by the server, a signal containing first unique information in response to the signal for requesting the authentication information, receiving, by the vehicle control device, the signal containing the first unique information transmitted in response to the signal for requesting the authentication information, from the server, identifying, by the server, the vehicle control device corresponding to the signal for requesting the authentication information and transmitting an short message service (SMS) message containing second unique information corresponding to the first unique information to the vehicle control device, receiving, by the vehicle control device, the SMS message containing the second unique information transmitted in response to the signal for requesting the authentication information, transmitting, by the vehicle control device, a signal containing third unique information corresponding to the second unique information to the server based on identifying the second unique information corresponding to the first unique information, transmitting, by the server, the authentication information to the vehicle control device based on receiving the signal containing the third unique information transmitted in response to the transmitted SMS message, receiving, by the vehicle control device, the authentication information from the server based on the transmitted signal containing the third unique information, and performing, by the vehicle control device, a service based on the authentication information.

In the authentication method according to another embodiment, the receiving of the SMS message containing the second unique information transmitted in response to the signal for requesting the authentication information by the vehicle control device may include receiving, by the vehicle control device, the SMS message containing the second unique information through legacy cellular wireless communication. In the authentication method according to another embodiment, the identifying of the vehicle control device corresponding to the signal for requesting the authentication information and transmitting the SMS message containing the second unique information corresponding to the first unique information to the vehicle control device by the server may include transmitting, by the server, the SMS message containing the second unique information through the legacy cellular wireless communication.

In the authentication method according to another embodiment, the authentication method may further include transmitting, by the vehicle control device, a signal for notifying acquisition of the authentication information to the server based on receiving the authentication information.

In the authentication method according to another embodiment, the authentication information may contain at least one of a vehicle identifier, validity time information for authentication, or issuance information, or any combination thereof.

In the authentication method according to another embodiment, the transmitting of the authentication information to the vehicle control device based on receiving the signal containing the third unique information transmitted in response to the transmitted SMS message by the server may include receiving, by the server, a signal containing the third unique information from the vehicle control device, and transmitting, by the server, the authentication information to the vehicle control device based on identifying the third unique information corresponding to the second unique information.

In the authentication method according to another embodiment, the authentication method may further include storing, by the server, the authentication information and the second unique information based on receiving the signal for requesting the authentication information, and identifying, by the server, the third unique information corresponding to the stored second unique information.

In the authentication method according to another embodiment, the transmitting of the signal containing the first unique information in response to the signal for requesting the authentication information by the server may include generating, by the server, the first unique information in response to the signal for requesting the authentication information.

In the authentication method according to another embodiment, the server may include a first server and a second server, In the authentication method according to another embodiment, the authentication method may further include transmitting, by the first server, the signal for requesting the authentication information to the second server based on receiving the signal for requesting the authentication information, and receiving, by the first server, the authentication information from the second server.

In the authentication method according to another embodiment, the identifying of the vehicle control device corresponding to the signal for requesting the authentication information and transmitting the SMS message containing the second unique information corresponding to the first unique information to the vehicle control device by the server may include identifying, by the server, the vehicle control device based on pre-registered terminal information of the vehicle control device corresponding to the signal containing the first unique information.

In the authentication method according to another embodiment, the identifying of the vehicle control device corresponding to the signal for requesting the authentication information and transmitting the SMS message containing the second unique information corresponding to the first unique information to the vehicle control device by the server may include requesting, by the server, a communication service provider to transmit the SMS message containing the second unique information associated with the vehicle control device, based on terminal information assigned to the vehicle control device by the communication service provider. In the authentication method according to another embodiment, the receiving of, by the vehicle control device, the SMS message containing the second unique information transmitted in response to the signal for requesting the authentication information may include receiving, by the vehicle control device, the SMS message containing the second unique information from the communication service provider based on the terminal information.

BRIEF DESCRIPTION OF THE FIGURES

The above and other objects, features and advantages of the present disclosure will be more apparent from the following detailed description taken in conjunction with the accompanying drawings:

FIG. 7 illustrates a flowchart of operations of a server to improve security through a plurality of channels in an authentication method according to an embodiment of the present disclosure.

DETAILED DESCRIPTION

Figure 1:
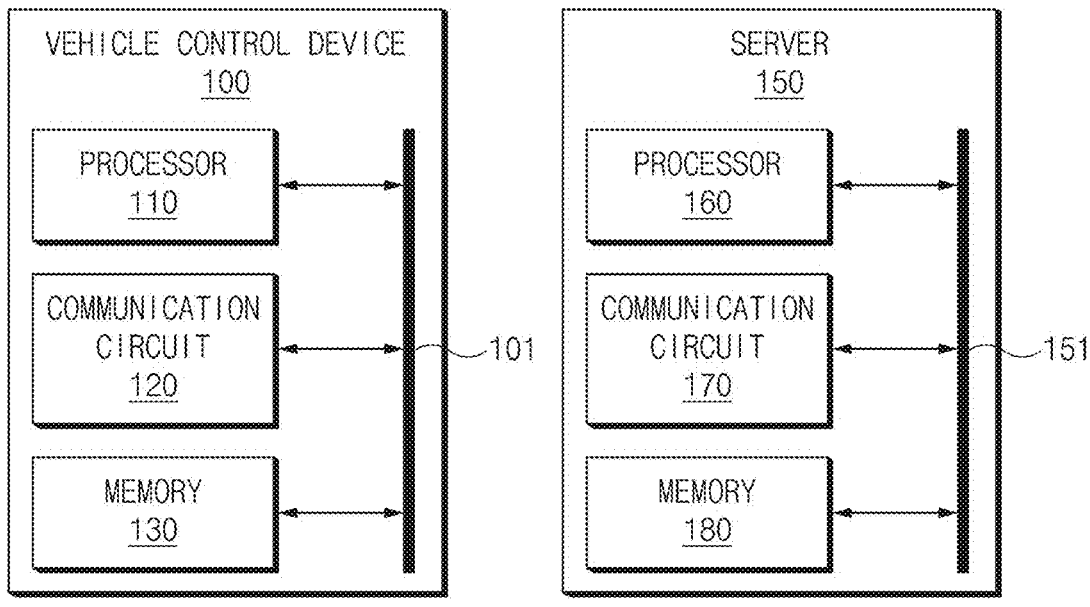
FIG. 1 is a block diagram of a vehicle control device and a server that constitute an authentication system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Recently, vehicles provide personalized services to users through external networks with the development of information and communication technology, and the importance of security for user information has increased. A vehicle control device may protect vehicle safety and privacy from the risk of hacking or third threat agents by performing initial authentication via wireless communication in a legacy cellular manner (e.g., a short message service (SMS) message and/or voice call) and wireless communication in a different cellular manner (e.g., fourth generation (4G), fifth generation (5G), and/or next generation wireless communication).

Hereinafter, embodiments of the present disclosure will be described in detail with reference to FIGS. 1 to 8.

FIG. 1 is a block diagram of a vehicle control device and a server that constitute an authentication system according to an embodiment of the present disclosure.

Referring to FIG. 1, a vehicle control device 100 constituting an authentication system according to an embodiment of the present disclosure may be implemented inside or outside a vehicle, and some of components included in the vehicle control device 100 may be implemented inside or outside the vehicle.

Referring to FIG. 1, the vehicle control device 100 may include at least one of a processor 110, a communication circuit 120, or a memory 130, or any combination thereof. The processor 110, the communication circuit 120, and/or the memory 130 may be electronically and/or operably coupled with each other by an electronic component such as a communication bus 101. A server 150 may include at least one of a processor 160, a communication circuit 170, or a memory 180, or any combination thereof. The processor 160, the communication circuit 170, and/or the memory 180 may be electronically and/or operably coupled with each other by an electronic component such as a communication bus 151.

According to an embodiment, hereinafter, combining pieces of hardware operatively may mean a direct connection or an indirect connection between the pieces of hardware being established in a wired or wireless manner such that first hardware of the pieces of hardware is controlled by second hardware of the pieces of hardware. Although shown based on different blocks, the embodiment is not limited thereto, and part of the hardware in FIG. 1 (e.g., at least part of the processor 110, the communication circuit 120, and the memory 130, or at least part of the processor 160, the communication circuit 170, and the memory 180) may be included in a single integrated circuit, such as a system on a chip (SoC). The type and/or number of hardware included in the vehicle control device 100 and/or server 150 is not limited to that shown in FIG. 1. For example, the vehicle control device 100 and/or the server 150 may include only part of the hardware components shown in FIG. 1.

According to an embodiment, the processor 110 of the vehicle control device 100 and/or the processor 160 of the server 150 may include hardware for processing data based on one or more instructions. The hardware for processing data may include, for example, an arithmetic and logic unit (ALU), a floating point unit (FPU), a field programmable gate array (FPGA), a central processing unit (CPU), and/or an application processor (AP). The processor 110 and/or the processor 160 may have the structure of a single-core processor or the structure of a multi-core processor such as a dual core, quad core, or hexa core processor.

According to an embodiment, the processor 110 may transmit a signal for requesting authentication information to the server 150 through the communication circuit 120. The authentication information (e.g., at least one of vehicle identifier, validity time information for authentication, or issuance information, or any combination thereof) may be information requested by the vehicle to provide services to a user (e.g., vehicle health check service, vehicle user-specific profile linkage service). Hereinafter, the signal for requesting authentication information may be transmitted and/received by HTTP (hypertext transfer protocol).

The processor 110 may receive signals responding to a signal for requesting authentication information from the server 150 through a plurality of channels (e.g., legacy cellular wireless communication or a different cellular wireless communication). For example, legacy cellular wireless communication may include short message service (SMS) messages and/or voice calls. For example, cellular wireless communication, which is different from legacy cellular wireless communication, may include 4th generation (4G), 5th generation (5G), and/or next-generation wireless communication. According to an embodiment, the processor 110 may receive a signal containing first unique information through a first channel (e.g., 4G, 5G, and/or next-generation wireless communication).

Hereinafter, the signal containing the first unique information may be transmitted and/or received by HTTP (hypertext transfer protocol). The processor 110 may receive a signal containing second unique information through a second channel (e.g., SMS message). The signal received through the second channel may be transmitted based on pre-registered terminal information (e.g., phone number). The pre-registered terminal information may correspond to the vehicle control device 100.

According to an embodiment, the first unique information and/or the second unique information may be information generated by the server to determine the validity of a signal for requesting authentication information. The first unique information and/or the second unique information may be generated by the server each time a signal for requesting authentication information is transmitted. For example, the first unique information and/or the second unique information may include one or more numbers (e.g., 165757546595). For example, the first unique information and/or the second unique information may include one or more letters (e.g., A, B, C, D, a, b, c, d).

The first unique information and/or the second unique information may be referred to as a transaction ID, but is not limited thereto. The first unique information and/or the second unique information may be managed as one unit. The second unique information may correspond to the first unique information. For example, the second unique information (e.g., a148387261b) may match the first unique information (e.g., a148387261b). For example, the second unique information (e.g., a148387261b) may include information in which the first unique information (e.g., a148387261c) has been changed by a certain logic.

According to an embodiment, the processor 110 may identify the fact that a signal for requesting authentication information has been transmitted from the vehicle control device 100 by comparing the first unique information included in the first channel with the second unique information included in the second channel. For example, the processor 110 may determine that the signal for requesting authentication information has been transmitted from the vehicle control device 100 based on identifying the second unique information corresponding to the first unique information. For example, the processor 110 may identify the fact that the signal for requesting authentication information has been transmitted from the vehicle control device 100, based on identifying the second unique information that matches the first unique information.

The processor 110 may identify the fact that the signal for requesting authentication information has not been transmitted from the vehicle control device 100. For example, the processor 110 may not receive a signal containing the first unique information, but may receive only an SMS message containing the second unique information. The processor 110 may determine the fact that a signal for requesting authentication information has not been transmitted because the first unique information does not match the second unique information.

According to an embodiment, the processor 110 may transmit a signal containing third unique information corresponding to the second unique information to the server 150, based on identifying that the signal for requesting authentication information has been transmitted from the vehicle control device 100. The processor 110 may receive authentication information from the server 150 based on transmitting the transmitted signal containing the third unique information. Hereinafter, the signal containing the third unique information may be transmitted and/or received by HTTP (hypertext transfer protocol).

According to an embodiment, the processor 160 of the server 150 may receive the signal for requesting authentication information from the vehicle control device 100 through the communication circuit 170. For example, the processor 160 of the server 150 may receive the signal for requesting authentication information through cellular wireless communication (e.g., 4G, 5G, and/or next-generation wireless communication) different from the legacy cellular wireless communication.

The processor 160 may not immediately transmit authentication information to the vehicle control device 100 in response to receiving the signal for requesting authentication information. This is because validity identification is required to identify whether the signal for requesting authentication information has been transmitted by the vehicle control device 100 for vehicle security and personal information protection. To identify the validity of the signal for requesting authentication information, the processor 160 may transmit unique information to the vehicle control device 100 through a plurality of channels. For example, the processor 160 may transmit the signal containing first unique information to the vehicle control device 100 through cellular wireless communication (e.g., 4G, 5G, and/or next-generation network) different from the legacy cellular wireless communication and transmit a message containing second unique information to the vehicle control device 100 through legacy cellular wireless communication (e.g., SMS message or voice call).

The processor 160 may identify the vehicle control device 100 corresponding to the signal for requesting authentication information to transmit the message. For example, the processor 160 may identify pre-registered terminal information (e.g., phone number) of the vehicle control device 100. The processor 160 may transmit an SMS message containing second unique information based on the pre-registered terminal information of the vehicle control device 100. According to an embodiment, the second unique information may correspond to the first unique information. For example, the second unique information may match the first unique information. According to an embodiment, the processor 160 may store the second unique information and the identified authentication information in the memory 180.

According to an embodiment, the processor 160 may receive a signal indicating the validity of the signal for requesting authentication information from the vehicle control device 100. According to an embodiment, when it is determined that the signal for requesting authentication information has been transmitted from the vehicle control device 100, the vehicle control device 100 may transmit a signal containing third unique information to the server 150 to indicate validity. The processor 160 may transmit authentication information to the vehicle control device 100 based on receiving the signal containing third unique information. The authentication information may be identified based on second unique information corresponding to the third unique information. This is because the processor 160 has stored the second unique information and the authentication information together.

According to an embodiment, the communication circuit 120 and the communication circuit 170 may support establishing a wireless communication channel between the vehicle control device 100 and the server 150 and performing communication through an established communication channel. According to an embodiment, the communication circuit 120 and/or the communication circuit 170 may include a legacy cellular communication module, a cellular communication module, a short-range wireless communication module, or a global navigation satellite system (GNSS) communication module. The communication circuit 120 and/or the communication circuit 170 may support a 4G network, a 5G network after the 4G network, and next-generation communication technology, for example, new radio (NR) access technology.

According to an embodiment, the memory 130 of the vehicle control device 100 may include a hardware component for storing data and/or instructions which are input to and/or output from the processor 110 of the vehicle control device 100. The memory 180 of the server 150 may include a hardware component for storing data and/or instructions which are input to and/or output from the processor 160 of the server 150.

The memory 130 and/or the memory 180 may include, for example, volatile memory such as random-access memory (RAM) and/or non-volatile memory such as read-only memory (ROM). The volatile memory may include, for example, at least one of dynamic RAM (DRAM), static RAM (SRAM), cache RAM, and pseudo SRAM (PSRAM). The non-volatile memory may include, for example, programmable ROM (PROM), erasable PROM (EPROM), electrically erasable PROM (EEPROM), flash memory, hard disk, compact disk, solid state drive (SSD), and embedded multi-media card (eMMC).

Figure 2:
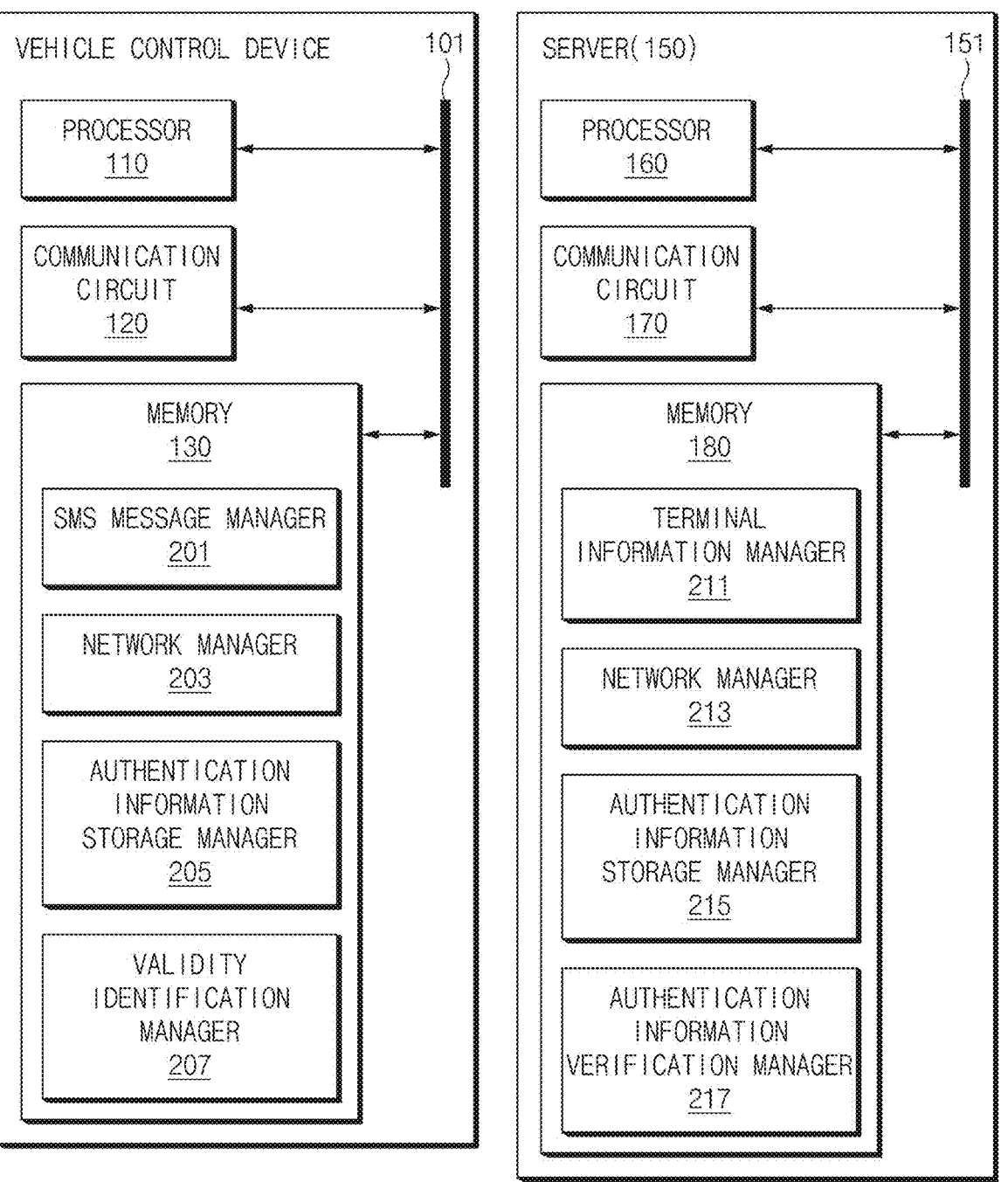
FIG. 2 is a diagram specifically illustrating a vehicle control device and a server that constitute an authentication system according to an embodiment of the present disclosure.

FIG. 2 is a diagram specifically illustrating a vehicle control device and a server that constitute an authentication system according to an embodiment of the present disclosure.

Referring to FIG. 2, the vehicle control device 100 may include at least one of the processor 110, the communication circuit 120, or the memory 130, or any combination thereof. The processor 110, the communication circuit 120, and/or the memory 130 may be electronically and/or operably coupled with each other by an electronic component such as the communication bus 101. An SMS message manager 201, a network manager 203, an authentication information storage manager 205, and a validity identification manager 207 may be stored in the memory 130 of the vehicle control device 100.

The server 150 may include at least one of the processor 160, the communication circuit 170, or the memory 180, or any combination thereof. The processor 160, the communication circuit 170, and/or the memory 180 may be electronically and/or operably coupled with each other by an electronic component such as the communication bus 151. A terminal information manager 211, a network manager 213, an authentication information storage manager 215, and an authentication information verification manager 217 may be stored in the memory 180 of the server 150. Because the vehicle control device 100 and the server 150 have been described with reference to FIG. 1, overlapping descriptions will be omitted below.

According to an embodiment, the processor 110 of the vehicle control device 100 may transmit a signal for requesting authentication information to the server 150 through the network manager 203. The processor 160 of the server 150 may receive the signal for requesting authentication information through the network manager 213. The processor 160 may generate first unique information and second unique information corresponding to the first unique information. The processor 160 may transmit a signal containing the first unique information to the vehicle control device 100 through the network manager 213. The processor 110 may receive the signal containing the first unique information through the network manager 203.

According to an embodiment, the processor 160 may store the second unique information and the authentication information together through the authentication information storage manager 215. When receiving a signal indicating the validity of an authentication request from the vehicle control device 100, the processor 160 may transmit authentication information verified through the second unique information.

According to an embodiment, the processor 160 may identify pre-registered terminal information of the vehicle control device 100 corresponding to the signal for requesting authentication information through the terminal information manager 211. Terminal information may be assigned to the vehicle control device 100 by a communication service provider. The processor 160 may request the communication service provider to transmit an SMS message containing the second unique information. The processor 110 may receive the SMS message containing the second unique information through the SMS message manager 201.

According to an embodiment, the processor 110 may identify whether the second unique information corresponds to the first unique information through the validity identification manager 207. When the second unique information corresponds to the first unique information, the processor 110 may identify the fact that the vehicle control device 100 has transmitted the signal for requesting authentication information. The processor 110 may transmit a signal containing third unique information corresponding to the second unique information to the server 150 through the network manager 203.

According to an embodiment, the processor 160 may identify third unique information corresponding to the second unique information through the authentication information verification manager 217. When the third unique information corresponds to the second unique information, the processor 160 may identify authentication information stored to correspond to the second unique information. The processor 160 may transmit the authentication information to the vehicle control device 100 through the network manager 213.

According to an embodiment, the processor 110 may store the authentication information received through the authentication information storage manager 205. The processor 110 may provide a service to a user using stored authentication information.

Figure 3:
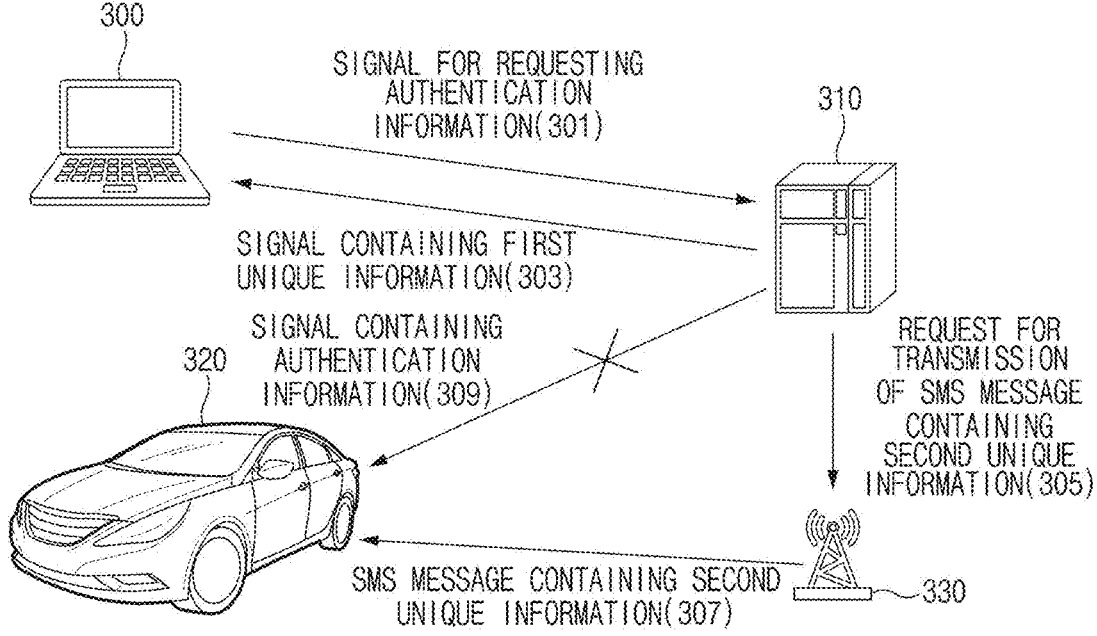
FIG. 3 is a diagram illustrating a configuration for preventing hacking for an authentication system according to an embodiment of the present disclosure.

FIG. 3 is a diagram illustrating a configuration for preventing hacking for an authentication system according to an embodiment of the present disclosure.

Referring to FIG. 3, in operation 301, a threat agent 300 may transmit a signal for requesting authentication information to a server 310 to steal the authentication information of a vehicle 320 to intimidate the security of a vehicle or obtain personal information.

In operation 303, according to an embodiment, the server 310 may transmit a signal containing first unique information to the threat agent 300 to identify the validity of the signal for requesting authentication information, instead of transmitting the authentication information to the threat agent 300. The first unique information may be generated in the server 310. The first unique information may be generated whenever a signal for requesting authentication information is generated.

In operation 305, according to an embodiment, the server 310 may request a communication service provider 330 to transmit an SMS message containing second unique information. According to an embodiment, the second unique information may correspond to the first unique information. For example, the second unique information may match the first unique information.

In operation 307, according to one embodiment, the communication service provider 330 may transmit an SMS message containing second unique information to the vehicle 320. The vehicle 320 may identify the validity of the signal for requesting authentication information when the second unique information corresponds to the first unique information. Because the vehicle 320 did not receive a signal containing the first unique information, the vehicle 320 may not identify the first unique information corresponding to the second unique information contained in the SMS message. Accordingly, the vehicle 320 may identify the fact that the signal for requesting authentication information is invalid. In other words, because the vehicle 320 did not transmit the signal for requesting authentication information, the vehicle 320 may not identify the second unique information corresponding to the first unique information.

In operation 309, according to an embodiment, the vehicle 320 may not receive a signal containing authentication information from the server 310. Therefore, according to an embodiment, the present disclosure may protect vehicle safety and personal information from the threat agent 300 by identifying the validity of a signal for requesting authentication information through a plurality of channels.

Figure 4:
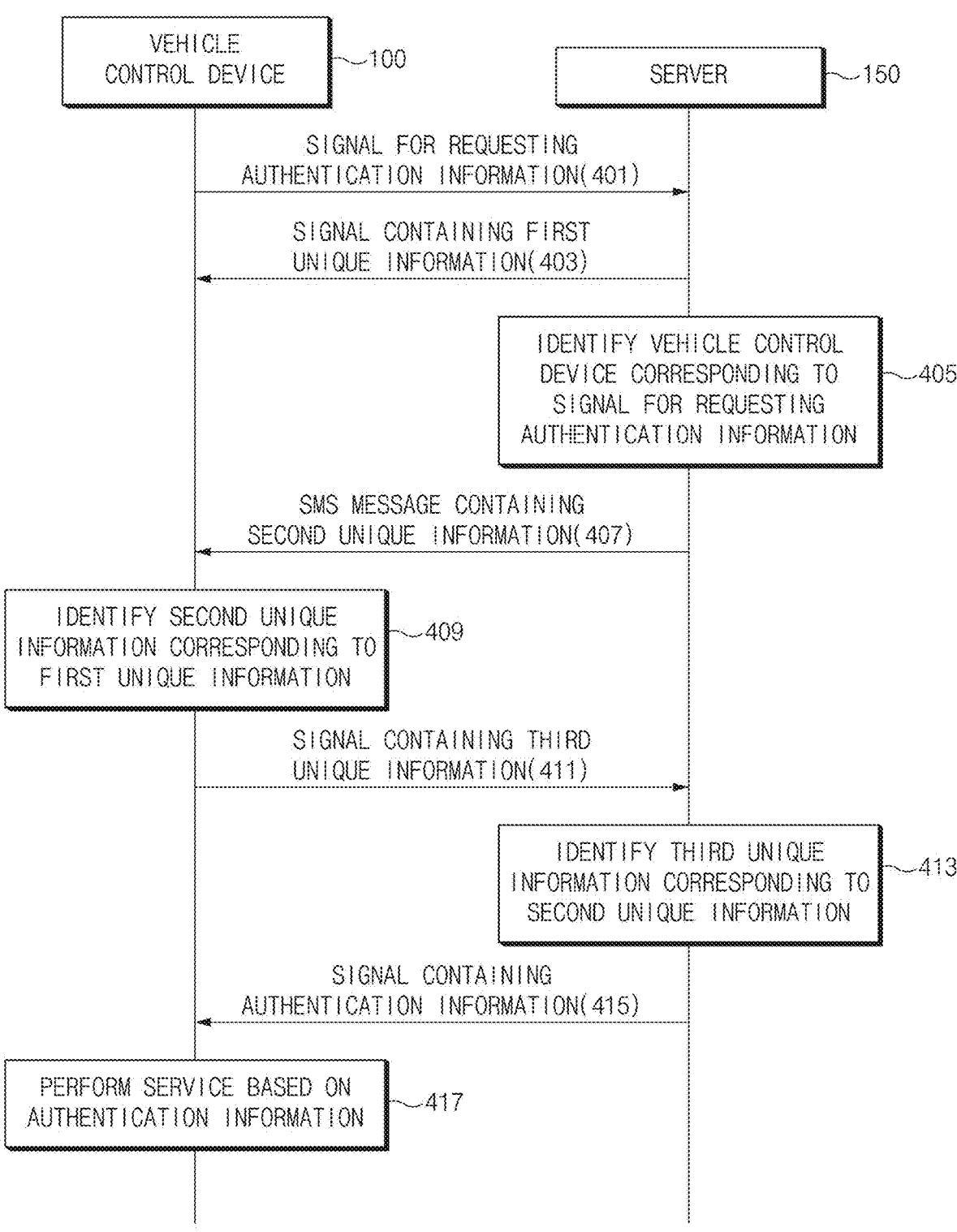
FIG. 4 illustrates an example of signaling between a vehicle control device and a server to improve security through a plurality of channels in an authentication system or an authentication method according to an embodiment of the present disclosure.

FIG. 4 illustrates an example of signaling between a vehicle control device and a server to improve security through a plurality of channels in an authentication system or an authentication method according to an embodiment of the present disclosure.

Hereinafter, an authentication method according to an embodiment of the present disclosure will be described in detail with reference to FIG. 4. FIG. 4 is a diagram for describing an authentication method according to an embodiment of the present disclosure. Hereinafter, it is assumed that the vehicle control device 100 of FIG. 1 and the server 150 of FIG. 1 perform the process of FIG. 4. Additionally, in the description of FIG. 4, operations described as being performed by the device may be understood as being controlled by the processor 110 of the vehicle control device 100 and/or the processor 160 of the server 150.

Referring to FIG. 4, in operation 401, according to an embodiment, the vehicle control device 100 may transmit a signal for requesting authentication information to the server 150. The server 150 may receive the signal for requesting authentication information. The authentication information (e.g., at least one of vehicle identifier, validity time information for authentication, or issuance information, or any combination thereof) may be information requested by the vehicle to provide services to a user (e.g., vehicle health check service, vehicle user-specific profile linkage service).

In operation 403, according to an embodiment, the server 150 may transmit a signal containing first unique information. The vehicle control device 100 may receive the signal containing first unique information. The first unique information may be generated by the server 150. The first unique information may be referred to as a transaction ID, but is not limited thereto. The signal containing the first unique information may be transmitted and/or received through cellular wireless communication (e.g., 4G, 5G, next-generation wireless communication) different from legacy cellular wireless communication.

In operation 405, according to an embodiment, the server 150 may identify the vehicle control device 100 corresponding to the signal for requesting authentication information. The server 150 may identify pre-registered terminal information (e.g., phone number) corresponding to the vehicle control device 100 to identify the validity of the signal for requesting authentication information through a plurality of channels. The pre-registered terminal information may be a number assigned to the vehicle control device 100 by the communication service provider.

In operation 407, according to an embodiment, the server 150 may transmit an SMS message containing second unique information. The vehicle control device 100 may receive the SMS message containing second unique information. According to an embodiment, the second unique information may correspond to the first unique information. For example, the second unique information may match the first unique information. The second unique information may be referred to as a transaction ID, but is not limited thereto. The server 150 may store the second unique information and authentication information together.

In operation 409, according to an embodiment, the vehicle control device 100 may identify second unique information corresponding to first unique information. The vehicle control device 100 may identify that the first unique information and the second unique information correspond to each other. When the second unique information corresponds to the first unique information, the vehicle control device 100 may determine the validity of the signal for requesting authentication information. In other words, when the second unique information corresponds to the first unique information, the vehicle control device 100 may identify that the vehicle control device 100, not a threat agent, has transmitted the signal for requesting authentication information.

In operation 411, according to an embodiment, the vehicle control device 100 may transmit a signal containing third unique information. The server 150 may receive the signal containing third unique information. The vehicle control device 100 may transmit third unique information to the server 150 based on identifying the second unique information corresponding to the first unique information. The third unique information may correspond to the second unique information. For example, the third unique information may match the second unique information. The third unique information may be referred to as a transaction ID, but is not limited thereto.

In operation 413, according to an embodiment, the server 150 may identify the third unique information corresponding to the second unique information. According to an embodiment, the server 150 may identify the second unique information based on the third unique information. For example, the third unique information may match the second unique information. The server 150 may identify authentication information stored together with the identified second unique information.

In operation 415, according to an embodiment, the server 150 may transmit a signal containing authentication information. The vehicle control device 100 may receive the signal containing authentication information. Because the validity of the signal for requesting authentication information has been identified, the server 150 may transmit the signal containing authentication information to the vehicle control device 100. According to an embodiment, the authentication information may include information necessary for the vehicle to provide a service to a user.

In operation 417, according to an embodiment, the vehicle control device 100 may perform a service based on the authentication information. After initial authentication information has been obtained, the vehicle control device 100 may provide a service to the user based on the stored authentication information.

Figure 5:
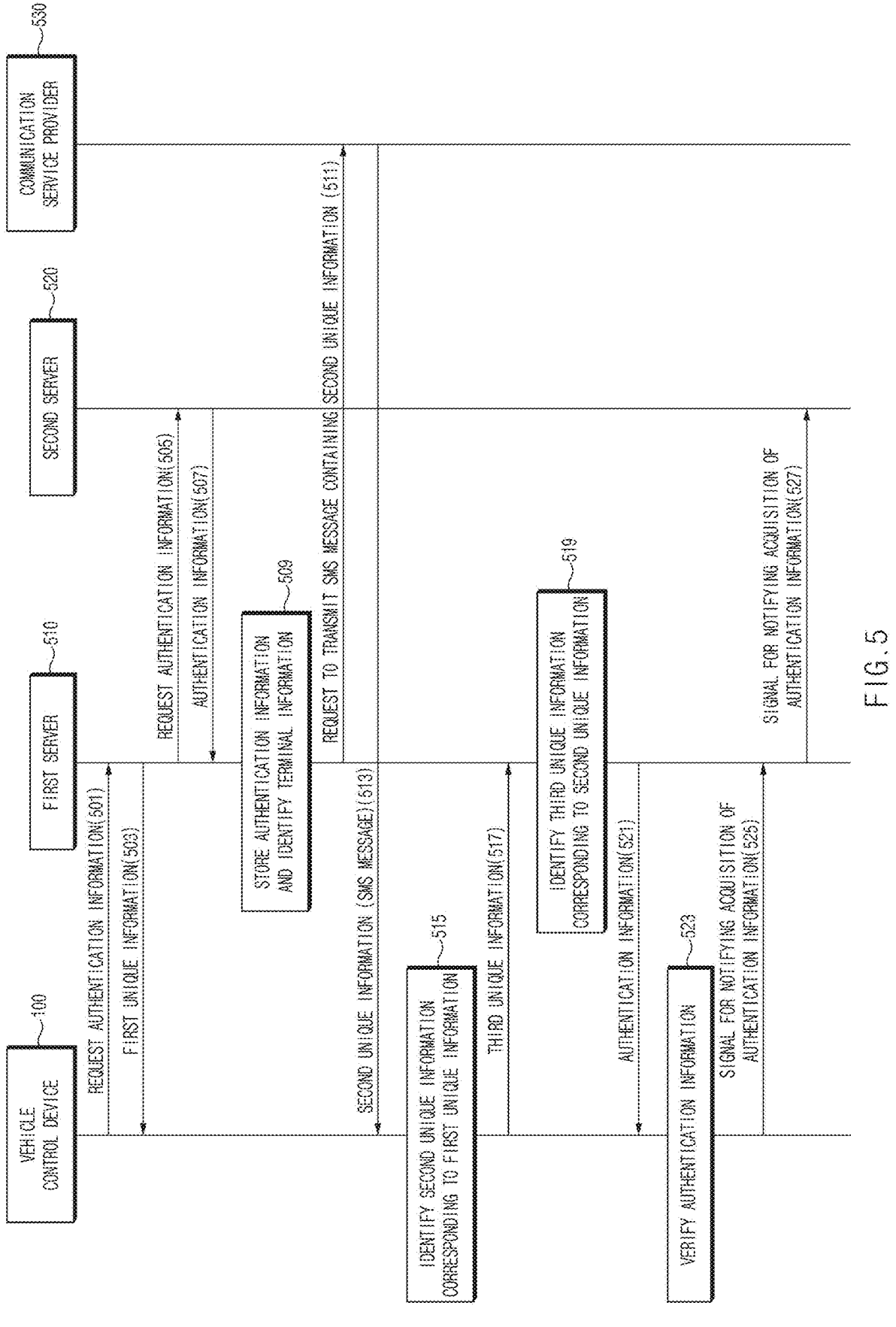
FIG. 5 illustrates an example of signaling among a vehicle control device, a first server, a second server, and a communication service provider to improve security through a plurality of channels in an authentication system or an authentication method according to an embodiment of the present disclosure.

FIG. 5 illustrates an example of signaling among a vehicle control device, a first server, a second server, and a communication service provider to improve security through a plurality of channels in an authentication system or an authentication method according to an embodiment of the present disclosure.

Hereinafter, an authentication method according to another embodiment of the present disclosure will be described in detail with reference to FIG. 5. FIG. 5 is a diagram for describing an authentication method according to another embodiment of the present disclosure. Hereinafter, it is assumed that the vehicle control device 100 of FIG. 1 and/or the server 150 of FIG. 1 performs the process of FIG. 5. The server 150 may include a first server and a second server. In addition, in the description of FIG. 5, operations described as being performed by the device may be understood as being controlled by the processor 110 of the vehicle control device 100, the processor of the first server, and/or the processor of the second server.

Referring to FIG. 5, a server (e.g., the server 150 of FIG. 1) may include a first server 510 and a second server 520. According to an embodiment, the first server 510 may transmit a signal and/or a message containing unique information to the vehicle control device 100 through a plurality of channels to determine the validity of the signal. The second server 520 may generate authentication information. The first server 510 may be referred to as a communication connection system, but is not limited thereto. The second server 520 may be referred to as an authentication information issuing system, but is not limited thereto.

In operation 501, according to an embodiment, the vehicle control device 100 may request authentication information from the first server 510. The first server 510 may receive a request for the authentication information from the vehicle control device 100. The authentication information may be transmitted and/or received via a hypertext transfer protocol (HTTP). Because operation 501 may be performed in the same manner as operation 401 of FIG. 4, a redundant description will be omitted below.

In operation 503, according to an embodiment, the first server 510 may transmit first unique information to the vehicle control device 100. The vehicle control device 100 may receive a signal containing the first unique information from the first server 510. Because operation 503 may be performed in the same manner as operation 403 of FIG. 4, a redundant description will be omitted below.

In operation 505, according to an embodiment, the first server 510 may request the authentication information from the second server 520. The second server 520 may receive a request for the authentication information from the first server 510. The authentication information may contain information necessary for the vehicle to provide a service. A signal for requesting the authentication information may be transmitted and/or received via a hypertext transfer protocol (HTTP).

In operation 507, according to an embodiment, the second server 520 may transmit the authentication information to the first server 510. The first server 510 may receive the authentication information from the second server 520. Before transmitting the received authentication information to the vehicle control device 100, the first server 510 may determine whether a request for the authentication information has been transmitted from the vehicle control device 100 through a plurality of channels. The authentication information may be transmitted and/or received via a hypertext transfer protocol (HTTP).

In operation 509, according to an embodiment, the first server 510 may store the authentication information and identify terminal information. The first server 510 may store second unique information generated by the first server 510 along with the authentication information. The second unique information may correspond to the first unique information. The first server 510 may specify the vehicle control device 100 for which authentication information has been requested by searching for terminal information provided by the communication service provider. The vehicle control device 100 may be specified by the terminal information. According to an embodiment, the terminal information may be a phone number, but is not limited thereto.

In operation 511, according to an embodiment, the first server 510 may request a communication service provider 530 to transmit an SMS message containing second unique information. The communication service provider 530 may receive a request for transmission of the SMS message containing the second unique information, from the first server 510. The SMS message may be transmitted and/or received via legacy cellular wireless communication.

In operation 513, according to an embodiment, the communication service provider 530 may transmit the second unique information to the vehicle control device 100 through an SMS message. The vehicle control device 100 may receive the second unique information from the communication service provider 530 through the SMS message.

In operation 515, according to an embodiment, the vehicle control device 100 may identify the second unique information corresponding to first unique information. Because operation 515 may be performed in the same manner as operation 409 of FIG. 4, a redundant description will be omitted below.

In operation 517, according to an embodiment, the vehicle control device 100 may transmit third unique information to the first server 510. The first server 510 may receive the third unique information from the vehicle control device 100. The third unique information may be transmitted and/or received via a hypertext transfer protocol (HTTP). Because operation 517 may be performed in the same manner as operation 411 of FIG. 4, a redundant description will be omitted below.

In operation 519, according to an embodiment, the first server 510 may identify the third unique information corresponding to the second unique information. Because operation 519 may be performed in the same manner as operation 413 of FIG. 4, a redundant description will be omitted below.

In operation 521, according to an embodiment, the first server 510 may transmit authentication information to the vehicle control device 100. The vehicle control device 100 may receive the authentication information from the first server 510. Because operation 521 may be performed in the same manner as operation 415 of FIG. 4, a redundant description will be omitted below.

In operation 523, according to an embodiment, the vehicle control device 100 may verify the authentication information. According to an embodiment, the vehicle control device 100 may verify whether information contained in the authentication information is requested information.

In operation 525, the vehicle control device 100 may transmit a signal for notifying the first server 510 of acquisition of the authentication information to the first server 510. The first server 510 may receive a signal for notifying the acquisition of the authentication information from the vehicle control device 100. The signal for notifying acquisition of the authentication information may be transmitted and/or received via a hypertext transfer protocol (HTTP). The first server 510 may delete the second unique information and authentication information, which are stored, from the memory of the first server 510.

In operation 527, the first server 510 may transmit a signal for notifying the acquisition of the authentication information to the second server 520. The signal for notifying acquisition of the authentication information may be transmitted and/or received via a hypertext transfer protocol (HTTP). The second server 520 may receive the signal for notifying the acquisition of the authentication information from the first server 510. Thereafter, transmission of the authentication information may be completed.

Figure 6:
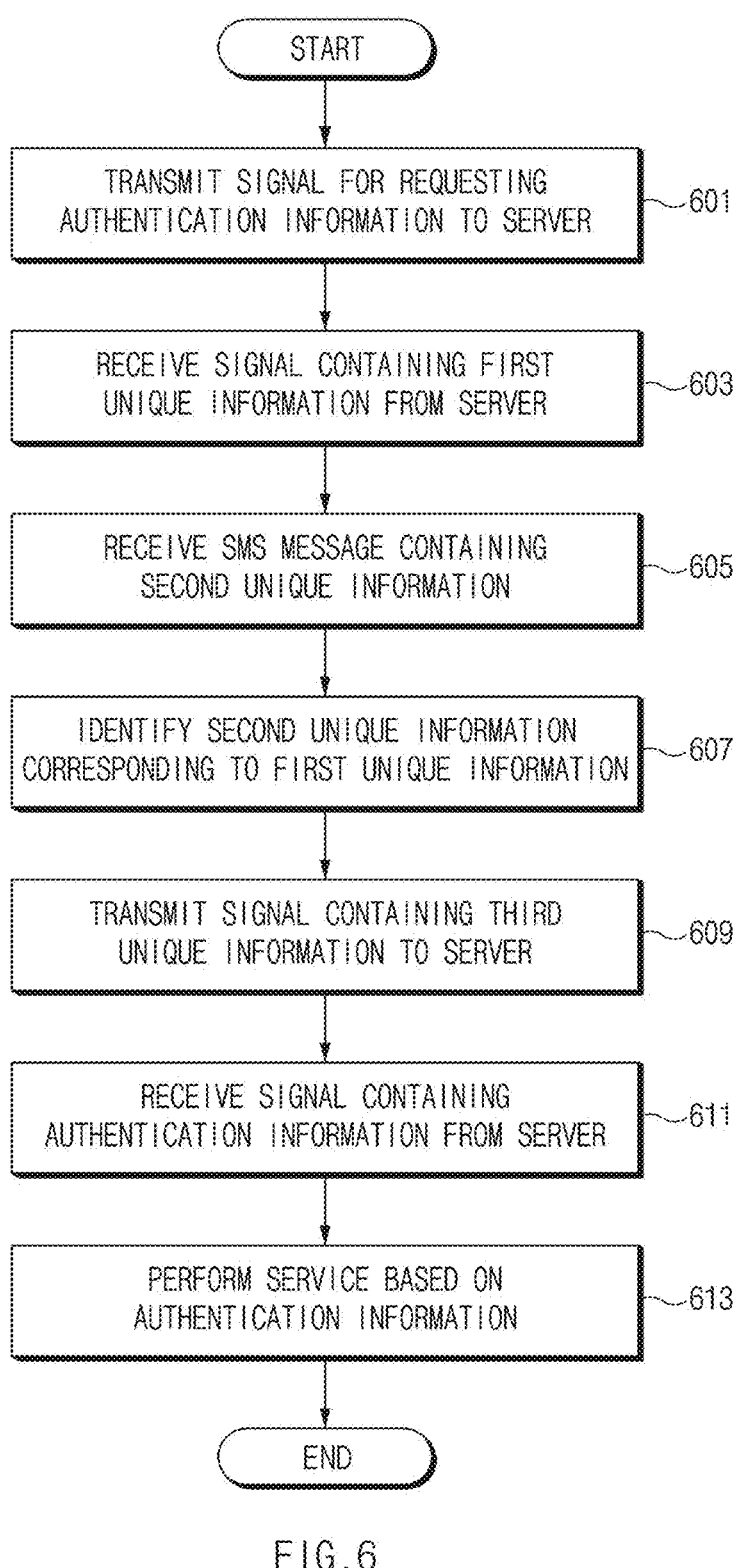
FIG. 6 illustrates a flowchart of operations of a vehicle control device to improve security through a plurality of channels in an authentication method according to an embodiment of the present disclosure.

FIG. 6 illustrates a flowchart of operations of a vehicle control device to improve security through a plurality of channels in an authentication method according to an embodiment of the present disclosure.

Hereinafter, an authentication method according to another embodiment of the present disclosure will be described in detail with reference to FIG. 6. FIG. 6 is a flowchart for describing an authentication method according to another embodiment of the present disclosure. Hereinafter, it is assumed that the vehicle control device 100 of FIG. 1 performs the process of FIG. 6. Additionally, in the description of FIG. 6, operations described as being performed by the device may be understood as being controlled by the processor 110 of the vehicle control device 100.

Referring to FIG. 6, in operation 601, according to an embodiment, the vehicle control device may transmit a signal for requesting authentication information to a server. The authentication information (e.g., at least one of vehicle identifier, validity time information for authentication, or issuance information, or any combination thereof) may be information requested by the vehicle to provide services to a user (e.g., vehicle health check service, vehicle user-specific profile linkage service).

In operation 603, according to an embodiment, the vehicle control device may transmit a signal containing first unique information to the server. The first unique information may be generated by the server. The first unique information may be referred to as a transaction ID, but is not limited thereto. The signal containing the first unique information may be transmitted and/or received through cellular wireless communication (e.g., 4G, 5G, next-generation wireless communication) different from legacy cellular wireless communication.

In operation 605, according to an embodiment, the vehicle control device may receive an SMS message containing second unique information. According to an embodiment, the second unique information may correspond to the first unique information. For example, the second unique information may match the first unique information. The second unique information may be referred to as a transaction ID, but is not limited thereto.

In operation 607, according to an embodiment, the vehicle control device may identify the second unique information corresponding to the first unique information. When the second unique information corresponds to the first unique information, the vehicle control device may identify the validity of the signal for requesting the authentication information. In other words, when the second unique information corresponds to the first unique information, the vehicle control device may identify that the vehicle control device, not the threat agent, has transmitted the signal for requesting the authentication information.

In operation 609, according to an embodiment, the vehicle control device may transmit a signal containing third unique information to the server. The third unique information may correspond to the second unique information. The third unique information may be referred to as a transaction ID, but is not limited thereto.

In operation 611, according to an embodiment, the vehicle control device may receive a signal containing the authentication information. The authentication information may contain information necessary for the vehicle to provide a service to a user.

In operation 613, according to an embodiment, the vehicle control device may perform a service based on the authentication information. After initial authentication information has been obtained, the vehicle control device may provide a service to the user based on the stored authentication information.

FIG. 7 illustrates a flowchart of operations of a server to improve security through a plurality of channels in an authentication method according to an embodiment of the present disclosure.

Hereinafter, an authentication method according to another embodiment of the present disclosure will be described in detail with reference to FIG. 7. FIG. 7 is a flowchart for describing an authentication method according to another embodiment of the present disclosure. Hereinafter, it is assumed that the server 150 of FIG. 1 performs the process of FIG. 7. Additionally, in the description of FIG. 7, operations described as being performed by the device may be understood as being controlled by the processor 160 of the server 150.

Referring to FIG. 7, in operation 701, according to an embodiment, the server may receive a signal for requesting authentication information. The server may generate first unique information and second unique information corresponding to the first unique information based on receiving the signal for requesting the authentication information.

In operation 703, according to an embodiment, the server may transmit a signal containing the first unique information. For example, the first unique information may be referred to as a transaction ID, but is not limited thereto. The server may manage an authentication system for each of signals for requesting authentication information through transaction IDs.

In operation 705, according to an embodiment, the server may identify the vehicle control device corresponding to the signal for requesting the authentication information. The server may identify pre-registered terminal information (e.g., phone number) corresponding to the vehicle control device to identify the validity of the signal for requesting the authentication information through a plurality of channels. The pre-registered terminal information may be a number assigned to the vehicle control device by a communication service provider.

In operation 707, according to an embodiment, the server may transmit an SMS message containing the second unique information to the vehicle control device. The second unique information may correspond to the first unique information. The server may request the communication service provider to transmit an SMS message containing the second unique information. The SMS message may be transmitted and/or received via legacy cellular wireless communication.

In operation 709, according to an embodiment, the server may receive a signal containing third unique information. The signal containing third unique information may be received from the vehicle control device when the validity of the signal requesting the authentication information is identified.

In operation 711, according to an embodiment, the server may identify the third unique information corresponding to the second unique information. The third unique information may correspond to the second unique information. For example, the third unique information may match the second unique information. According to an embodiment, the server may identify the authentication information stored along with the second unique information by identifying the third unique information that matches the second unique information.

In operation 713, according to an embodiment, the server may transmit a signal containing the authentication information to the vehicle control device. Because the validity of the signal for requesting authentication information has been identified, the server may transmit a signal containing the authentication information to the vehicle control device. According to an embodiment, the authentication information may contain information necessary for the vehicle to provide a service to the user.

Figure 8:
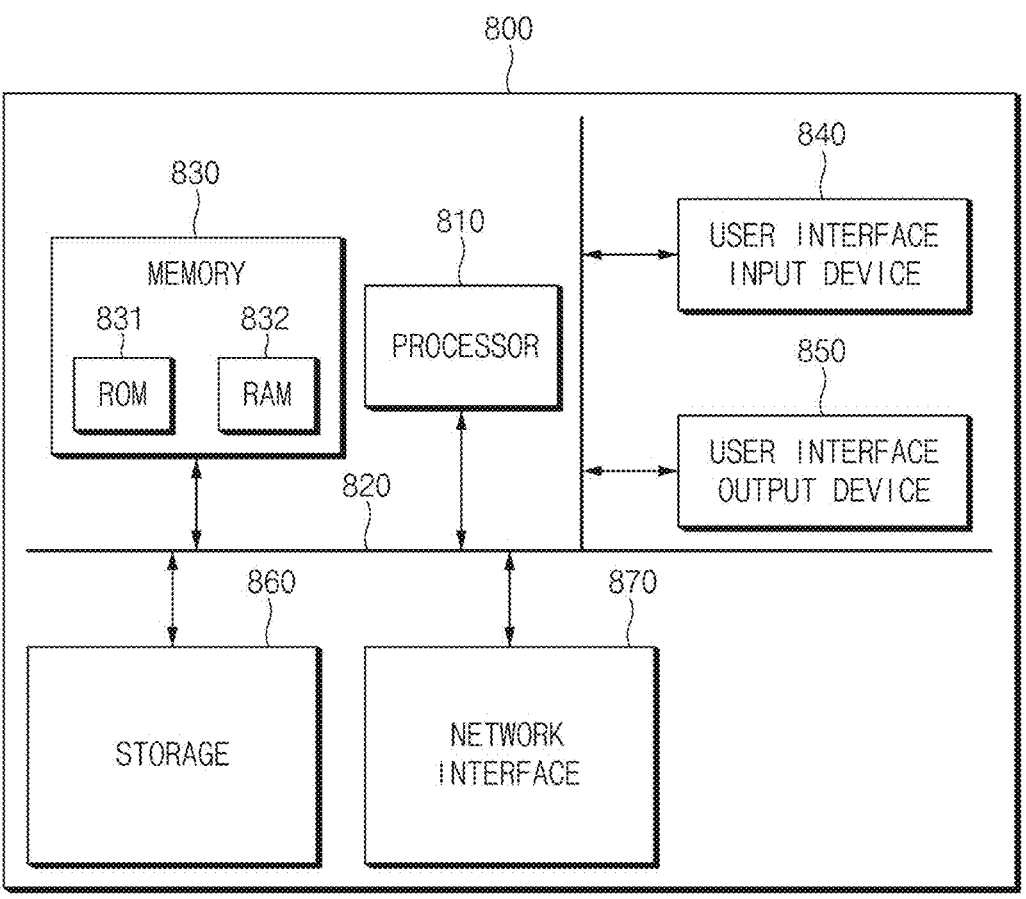
FIG. 8 illustrates a computing system for an authentication method according to an embodiment of the present disclosure.

FIG. 8 illustrates a computing system for an authentication method according to an embodiment of the present disclosure.

Referring to FIG. 8, a computing system 800 may include at least one processor 810, a memory 830, a user interface input device 840, a user interface output device 850, storage 860, and a network interface 870, which are connected with each other via a bus 820.

The processor 810 may be a central processing unit (CPU) or a semiconductor device that processes instructions stored in the memory 830 and/or the storage 860. The memory 830 and the storage 860 may include various types of volatile or non-volatile storage media. For example, the memory 830 may include a ROM (Read Only Memory) 831 and a RAM (Random Access Memory) 832.

Thus, the operations of the method or the algorithm described in connection with the embodiments disclosed herein may be embodied directly in hardware or a software module executed by the processor 810, or in a combination thereof. The software module may reside on a storage medium (that is, the memory 830 and/or the storage 860) such as a RAM, a flash memory, a ROM, an EPROM, an EEPROM, a register, a hard disk, a removable disk, and a CD-ROM.

The exemplary storage medium may be coupled to the processor 810, and the processor 810 may read information out of the storage medium and may record information in the storage medium. Alternatively, the storage medium may be integrated with the processor 810. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

The present technology may lower the risk of leakage of personal information and the malicious use of a vehicle by identifying the validity of a signal for requesting authentication information through a plurality of channels even when one of the plurality of channels is hacked.

Further, the present technology may determine the validity of a signal for requesting authentication information by comparing pieces of unique information received through a plurality of channels without human intervention, thus improving user experience for an authentication method.

Further, the present technology may group and manage pieces of unique information for requesting authentication information through a plurality of channels as a single unit, thus increasing authentication processing speed.

Further, the present technology may separate a subject issuing authentication information from a subject through a plurality of channels through multiple servers, thus reducing the amount of computation performed by each individual subject.

Further, the present technology may transmit only relatively simple unique information to a vehicle control device through an SMS message that is difficult to include a large amount of information and allow the vehicle control device to determine the validity of a signal requesting authentication information, thus increasing authentication processing speed.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. An authentication system comprising:
a vehicle control device;
a server;
a first processor included in the vehicle control device being configured to:
    transmit a signal for requesting authentication information to the server;
    receive a signal containing first unique information transmitted in response to the signal for requesting the authentication information, from the server;
    receive a short message service (SMS) message containing second unique information transmitted in response to the signal for requesting the authentication information;
    transmit a signal containing third unique information corresponding to the second unique information to the server based on identifying the second unique information corresponding to the first unique information;
    receive the authentication information from the server based on the transmitted signal containing the third unique information; and
    perform a service based on the authentication information;
a second processor included in the server being configured to:
    receive the signal for requesting the authentication information;
    transmit the signal containing the first unique information in response to the signal for requesting the authentication information;
    identify the vehicle control device corresponding to the signal for requesting the authentication information, and transmit the SMS message containing the second unique information corresponding to the first unique information to the vehicle control device; and
    transmit the authentication information to the vehicle control device based on receiving the signal containing the third unique information sent in response to the transmitted SMS message.

2. The authentication system of claim 1, wherein the first processor included in the vehicle control device is configured to receive the SMS message containing the second unique information through legacy cellular wireless communication; and
    wherein the second processor included in the server is configured to transmit the SMS message containing the second unique information through the legacy cellular wireless communication.

3. The authentication system of claim 1, wherein the first processor included in the vehicle control device is configured to transmit a signal for notifying acquisition of the authentication information to the server based on receiving the authentication information.

4. The authentication system of claim 1, wherein the authentication information contains at least one of a vehicle identifier, validity time information for authentication, or issuance information, or any combination thereof.

5. The authentication system of claim 1, wherein the second processor included in the server is configured to:
    receive a signal containing the third unique information from the vehicle control device; and
    transmit the authentication information to the vehicle control device based on identifying the third unique information corresponding to the second unique information.

6. The authentication system of claim 1, wherein the second processor included in the server is configured to:
    store the authentication information and the second unique information based on receiving the signal for requesting the authentication information; and
    identify the third unique information corresponding to the stored second unique information.

7. The authentication system of claim 1, wherein the second processor included in the server is configured to generate the first unique information in response to the signal for requesting the authentication information.

8. The authentication system of claim 1, wherein the server includes a first server including the second processor and a second server including a third processor; and
    wherein the second processor included in the first server is configured to transmit the signal for requesting the authentication information to the second server based on receiving the signal for requesting the authentication information, and to receive the authentication information from the second server.

9. The authentication system of claim 1, wherein the second processor included in the server is configured to identify the vehicle control device based on pre-registered terminal information of the vehicle control device corresponding to the signal containing the first unique information.

10. The authentication system of claim 1, wherein the second processor included in the server is configured to request a communication service provider to transmit the SMS message containing the second unique information associated with the vehicle control device based on terminal information assigned to the vehicle control device by the communication service provider; and
    wherein the first processor included in the vehicle control device is configured to receive the SMS message containing the second unique information from the communication service provider based on the terminal information.

11. An authentication method comprising:
    transmitting, by a vehicle control device, a signal for requesting authentication information to a server;
    receiving, by the server, the signal for requesting the authentication information;
    transmitting, by the server, a signal containing first unique information in response to the signal for requesting the authentication information;
    receiving, by the vehicle control device, the signal containing the first unique information transmitted in response to the signal for requesting the authentication information, from the server;
    identifying, by the server, the vehicle control device corresponding to the signal for requesting the authentication information and transmitting an short message service (SMS) message containing second unique information corresponding to the first unique information to the vehicle control device;

receiving, by the vehicle control device, the SMS message containing the second unique information transmitted in response to the signal for requesting the authentication information;

transmitting, by the vehicle control device, a signal containing third unique information corresponding to the second unique information to the server based on identifying the second unique information corresponding to the first unique information;

transmitting, by the server, the authentication information to the vehicle control device based on receiving the signal containing the third unique information transmitted in response to the transmitted SMS message;

receiving, by the vehicle control device, the authentication information from the server based on the transmitted signal containing the third unique information; and performing, by the vehicle control device, a service based on the authentication information.

12. The authentication method of claim 11, wherein the receiving of the SMS message containing the second unique information transmitted in response to the signal for requesting the authentication information by the vehicle control device includes receiving, by the vehicle control device, the SMS message containing the second unique information through legacy cellular wireless communication; and wherein the identifying of the vehicle control device corresponding to the signal for requesting the authentication information and transmitting the SMS message containing the second unique information corresponding to the first unique information to the vehicle control device by the server includes transmitting, by the server, the SMS message containing the second unique information through the legacy cellular wireless communication.

13. The authentication method of claim 11, further comprising;

transmitting, by the vehicle control device, a signal for notifying acquisition of the authentication information to the server based on receiving the authentication information.

14. The authentication method of claim 11, wherein the authentication information contains at least one of a vehicle identifier, validity time information for authentication, or issuance information, or any combination thereof.

15. The authentication method of claim 11, wherein the transmitting of the authentication information to the vehicle control device based on receiving the signal containing the third unique information transmitted in response to the transmitted SMS message by the server includes:

receiving, by the server, a signal containing the third unique information from the vehicle control device; and transmitting, by the server, the authentication information to the vehicle control device based on identifying the third unique information corresponding to the second unique information.

16. The authentication method of claim 11, further comprising:

storing, by the server, the authentication information and the second unique information based on receiving the signal for requesting the authentication information; and identifying, by the server, the third unique information corresponding to the stored second unique information.

17. The authentication method of claim 11, wherein the transmitting of the signal containing the first unique information in response to the signal for requesting the authentication information by the server includes generating, by the server, the first unique information in response to the signal for requesting the authentication information.

18. The authentication method of claim 11, wherein the server includes a first server and a second server, and the authentication method further comprises:

transmitting, by the first server, the signal for requesting the authentication information to the second server based on receiving the signal for requesting the authentication information; and receiving, by the first server, the authentication information from the second server.

19. The authentication method of claim 11, wherein the identifying of the vehicle control device corresponding to the signal for requesting the authentication information and transmitting the SMS message containing the second unique information corresponding to the first unique information to the vehicle control device by the server includes identifying, by the server, the vehicle control device based on pre-registered terminal information of the vehicle control device corresponding to the signal containing the first unique information.

20. The authentication method of claim 11, wherein the identifying of the vehicle control device corresponding to the signal for requesting the authentication information and transmitting the SMS message containing the second unique information corresponding to the first unique information to the vehicle control device by the server includes requesting, by the server, a communication service provider to transmit the SMS message containing the second unique information associated with the vehicle control device, based on terminal information assigned to the vehicle control device by the communication service provider; and wherein the receiving of, by the vehicle control device, the SMS message containing the second unique information transmitted in response to the signal for requesting the authentication information includes receiving, by the vehicle control device, the SMS message containing the second unique information from the communication service provider based on the terminal information.

* * * * *